US00RE37628E

(19) United States
(12) Reissued Patent
Segorski et al.

(10) Patent Number: US RE37,628 E
(45) Date of Reissued Patent: Apr. 9, 2002

(54) UNIVERSAL OFF ROAD VEHICLE SNOW PLOW

(76) Inventors: Michael J. Segorski, 1605 Minneapolis Ave., Gladstone, MI (US) 49837; Arnold R. Sirtola, 1456 W. Mapleridge, Rock, MI (US) 49880

(21) Appl. No.: 09/612,538

(22) Filed: Feb. 9, 2001

Related U.S. Patent Documents

Reissue of:
(64) Patent No.: 5,329,708
Issued: Jul. 19, 1994
Appl. No.: 07/915,421
Filed: Jul. 17, 1992

(51) Int. Cl.[7] ..... E01H 5/04
(52) U.S. Cl. ..... 37/231; 37/270; 37/273; 37/276
(58) Field of Search ..... 37/231, 232, 273, 37/270, 274, 276, 272

(56) References Cited

U.S. PATENT DOCUMENTS 3,012,345 A * 12/1961 Krueger ..... 37/273
4,658,915 A * 4/1987 Quenzi ..... 37/273 X
4,907,358 A * 3/1990 Moore ..... 37/273 X

FOREIGN PATENT DOCUMENTS

AT 221134 * 5/1962 ..... 37/274

* cited by examiner

*Primary Examiner*—H. Shackelford
(74) *Attorney, Agent, or Firm*—John R. Benefiel

(57) ABSTRACT

A hinged snow plow for an off-road vehicle is provided wherein a cowling is pivotally secured to the free end of an adapter. The adapter attaches to a tubular mounting means of a universal nature. The tubular mounting means which is modified, depending upon the off-road vehicle to which the snow plow is to be mounted. The combination of the adapter and tubular frame make the snow plow mountable to almost any off-road vehicle.

16 Claims, 3 Drawing Sheets

UNIVERSAL OFF ROAD VEHICLE SNOW PLOW

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to snow plows. More particularly, the invention relates to a hinged snow plow for use on off-road vehicles. The snow plow is designed so that an adapter bracket is easily mounted to a tubular frame which is made in many variations so that the snow plow of the present invention can be mounted to practically any off-road vehicle.

2. Description of the Prior Art

Hinged snow plows have been known in the art for many years in relationship to the mounting of various types of snow plows on pickup trucks for use on commercial settings. One such snow plow that is known is disclosed in U.S. Pat. No. 4,658,519, issued on Apr. 21, 1987, to Phillip J. Quenzi. This patent discloses a hinged snow plow wherein a cowling is pivotally secured to the free end of a support frame which attaches to a vehicle in a manner such that the cowling pivots in a generally vertical plane about the free end of the frame. The blades of the snow plow are hinged to the cowling. However, this snow plow has a first and second stop means which are undesirable for use in off-road vehicles. Off-road vehicles generally lack adequate traction and are underpowered for moving and clearing areas of snow on a commercial basis or for expanded personal use. The provision of the stop means on the Quenzi snow plow under certain conditions requires additional power which the off-road vehicle simply does not have. Also, the hydraulic adjustment means are impractical for use on off-road vehicles since a source of hydraulic power is just not available. The U.S. Pat. No. 3,307,275, issued on Mar. 7, 1967 to E. A. Simi, and the U.S. Pat. No. 3,706,144, issued Dec. 19, 1972 to Miceli, also suffer from one or more of these problems. Thus, those skilled in the snow plow art have continued to search for solutions to these problems.

SUMMARY OF THE INVENTION

To solve the problems in the prior art, a hinged snow plow is provided wherein a cowling is pivotally secured to the free end of an adapter. The adapter, which may be of a multi-piece construction, attaches to a tubular mounting means of a universal nature which is modified in a manner depending upon the vehicle the off-road snow plow is to be mounted to. The combination of the adapter and the tubular frame make the snow plow of the present invention mountable to almost any off-road vehicle. The cowling is mounted to a pivot means which allows it to pivot in a generally vertical plane about the adapter and is free to rotate virtually 360 degrees about said vertical plane to prevent any artificial stop means from acting during the operation of the snow plow. The blades of the hinged snow plow are hinged to the cowling, and a manual adjustment means is provided for positioning the blades so that a hydraulic source of power is not needed on the off-road vehicle.

Thus, it is an object of the present invention to provide an improved hinged snow plow usable on an off-road vehicle.

A further object of the present invention is to be provide a hinged off-road vehicle snow plow without artificial stop means to limit the tilting of the blades.

A still further object of the present invention is to provide a hinged snow plow for use on off-road vehicles having a manual adjustment means.

A still further object of the present invention is to provide a hinged off-road vehicle snow plow which does not require a source of hydraulic power for adjustment.

A still further object of the present invention is to provide an off-road vehicle snow plow which is easily mountable to a wide variety of off-road vehicles.

Further objects and advantages of the present invention will be apparent from the following description and depended claims, reference being made to the accompanying drawings forming a part of the Specification, wherein like reference characters designate corresponding parts in the several views.

It is to be understood that the present invention is not limited to the details of construction and arrangement of parts illustrated in the accompanying drawings, since the invention is capable of other embodiments, and is capable of being practiced or carried out in various ways within the scope of the claims. Also, it is to be understood that the phraseology and terminology employed herein is for the purpose of description and not of limitation.

DETAILED DESCRIPTION OF THE PREFERRED EMBODIMENT

Figure 1:
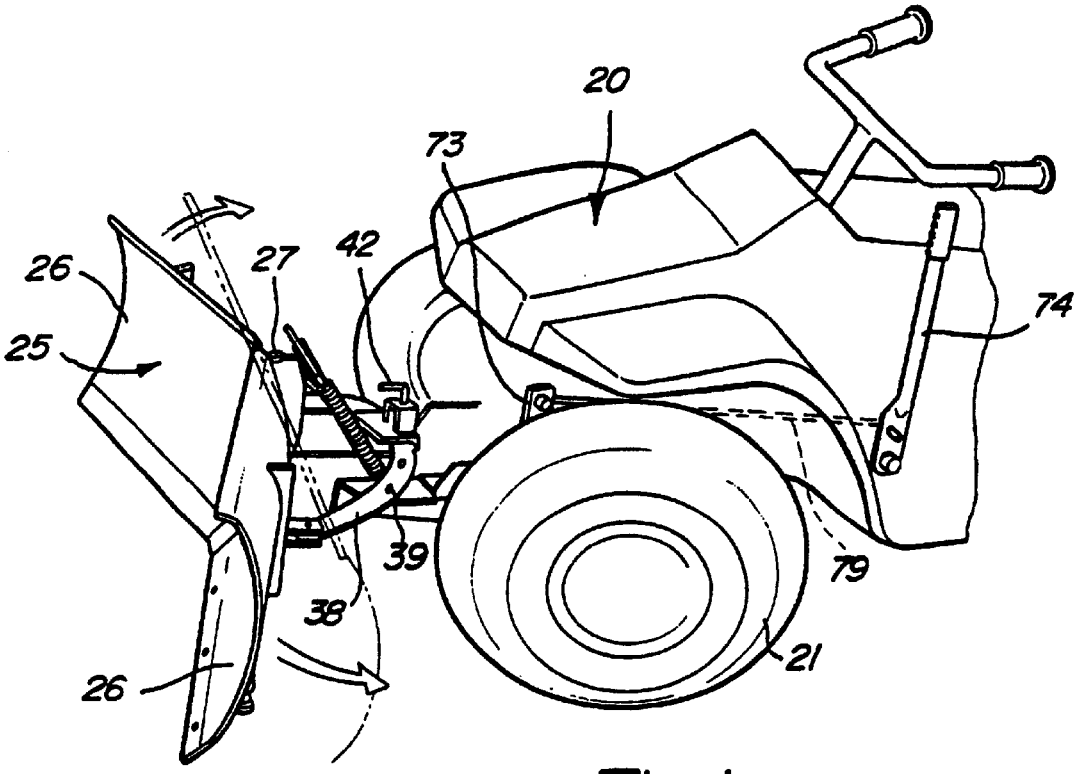
FIG. 1 is a perspective view of the snow plow of the present invention mounted to the front of an off-road vehicle.

Referring now to FIG. 1, there is shown an off-road vehicle, generally designated by the numeral 20, supported by one or more ground engaging tires 21. Mounted to the midpoint of the offroad vehicle frame or the forward end of A Lawn Tractor vehicle 20 is the snow plow of the present invention, generally designated by the numeral 25. The snow plow includes a pair of plow blades 26 which are hinged together at the hinge 27 provided on the cowling 28. Cowling 28 is mounted on the free end of multi-piece adapter 30. The plow blades 26 may be of a standard rectilinear shape well known in the art. Each blade hinge 27 includes a plurality of hinge collars 33, some of which are formed, welded or otherwise attached to the blade 26, and some of which are formed, welded or otherwise attached to the cowling 28. Vertically aligning the hinge collars 33 on the blades 26 with the hinge collars 33 on the cowling 28, and inserting the hinge pin 31 through the aligned openings formed thereby, hingedly attaches blades 26 to the cowling 28 and allows them to freely rotate about the pin 31, unless restrained by another means.

The blades 26 may be held in several preset desired positions. They may be set in the shape of a forward V, a reverse V, or a straight line configuration. The straight line configuration may be transverse to the axis of the off-road vehicle, or set at a desired angle. An adjustment means may include a pair of brackets 36 to which are mounted a pair of restraining means, such as radius rods 38, by means well known in the art. A plurality of holes 39 are provided proximate each end of the radius rods 38 for purposes to be described. The radius rods are passed between the upper portion 40 and the lower portion 41 of the cowling 28 and the desired pair of holes 39 are aligned. Pin means, to be described below, are used to hold the plow blades 26 in the desired position. A right angle portion 38A provided on the end of each rod 38 prevents the rods from accidentally coming out of the cowling when the blades are adjusted.

Figure 4:
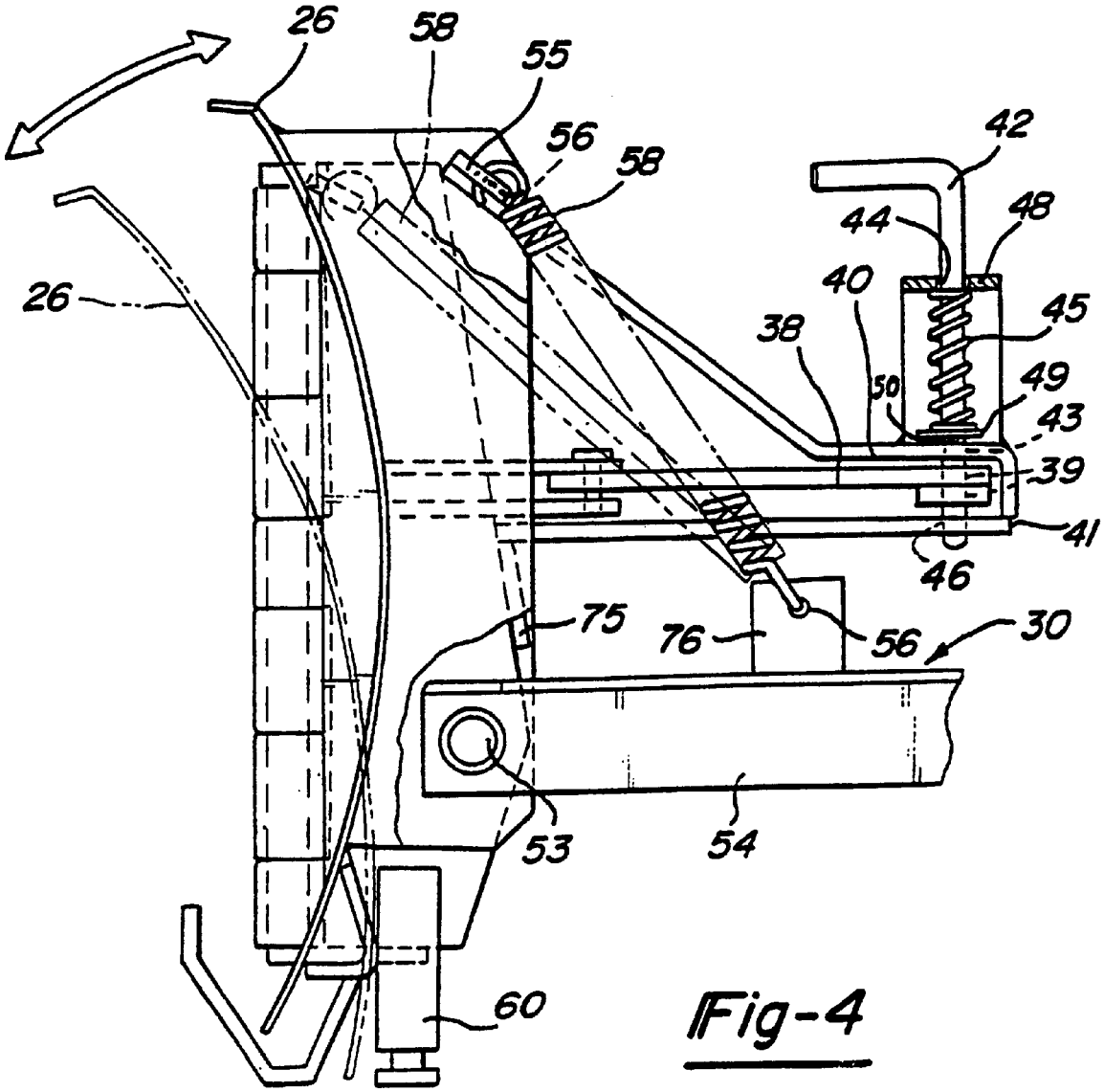
FIG. 4 is a partial elevational view of the snow plow of the present invention showing an embodiment of the manual adjustment means.

Referring now to FIG. 4, it can be seen that the holes 39 in the radius rods 38 can be placed in vertical alignment with a hole 43 provided in the upper portion 40 of the cowling 28, cowling bracket hole 44, and lower cowling hole 46. Passing through holes 43, 44, 39 and 46 is the spring loaded pin 42 which is maintained in a spring loaded condition by virtue of the spring 45 surrounding the spring loaded pin 42 and acting between the inner upper surface of the cowling bracket 48 and the washer 49. The washer is pinned to the spring loaded pin 42 by the transverse pin 50 by means well known in the art. It can be seen that lifting the pin 42 such that its lower end disengages from the holes 39, and the radius rods 38, allows the plow blades to be set in any desired position.

To allow the plow blades to pivot when obstacles are encountered, the lower portion of the cowling 28 has pivot means provided therein in the form of an elongated bearing 52 into which the pivot pin 53 fits to provide for rotation of the cowling 28 and thereby of the plow blades 26. Of importance to the present invention is the fact that the cowling, when the plow blades are unattached, can pivot 360 degrees between the arms 54 of the adapter 30, restrained only by the vertical stop 75.

Figure 3:
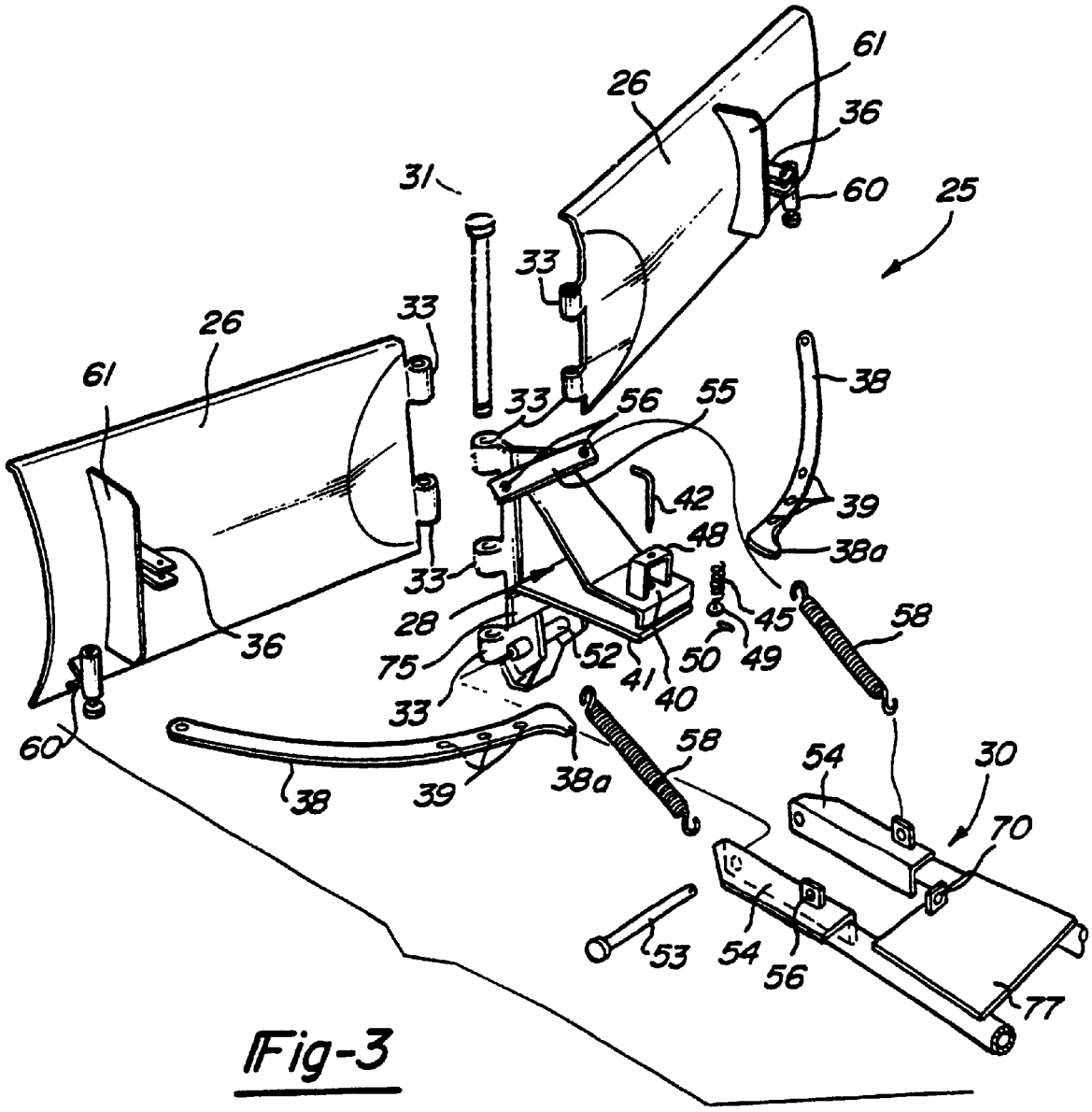
FIG. 3 is an exploded view of the snow plow of the present invention.

In operation, however, the plow blades 26 will be attached to the cowling 28 by the hinge 27 to hold the plow blades 26 in a generally vertical position. A spring bracket 55 is provided on the upper portion 40 of the cowling 28 and spring mounting holes 56 are provided in the bracket 55 as well as in the tab portions 76 provided on arms 54 forming a portion of the adapter 30. A stiffening plate 77, secured between the ends of tubular frame 65, is also considered part of the adaptor 30. A pair of tension providing springs 58 are mounted in a parallel relationship in the holes 56 as illustrated in FIG. 3.

As shown in FIG. 4, when the plow blades 26 hit an obstruction, the plow blades may tilt forward or rearward as needed to overcome the obstruction. Skids 60 of a type well known in the art may be provided to keep the plow blades 26 at a proper height above the surface being plowed. These skids may either be of a fixed or adjustable nature. Depending on the application to which the plow of the present invention is to be put, reinforcements 51 may be provided on the rear of the plow blades 26 if needed. These may be provided in combination with the brackets 36 if desired.

Figure 2:
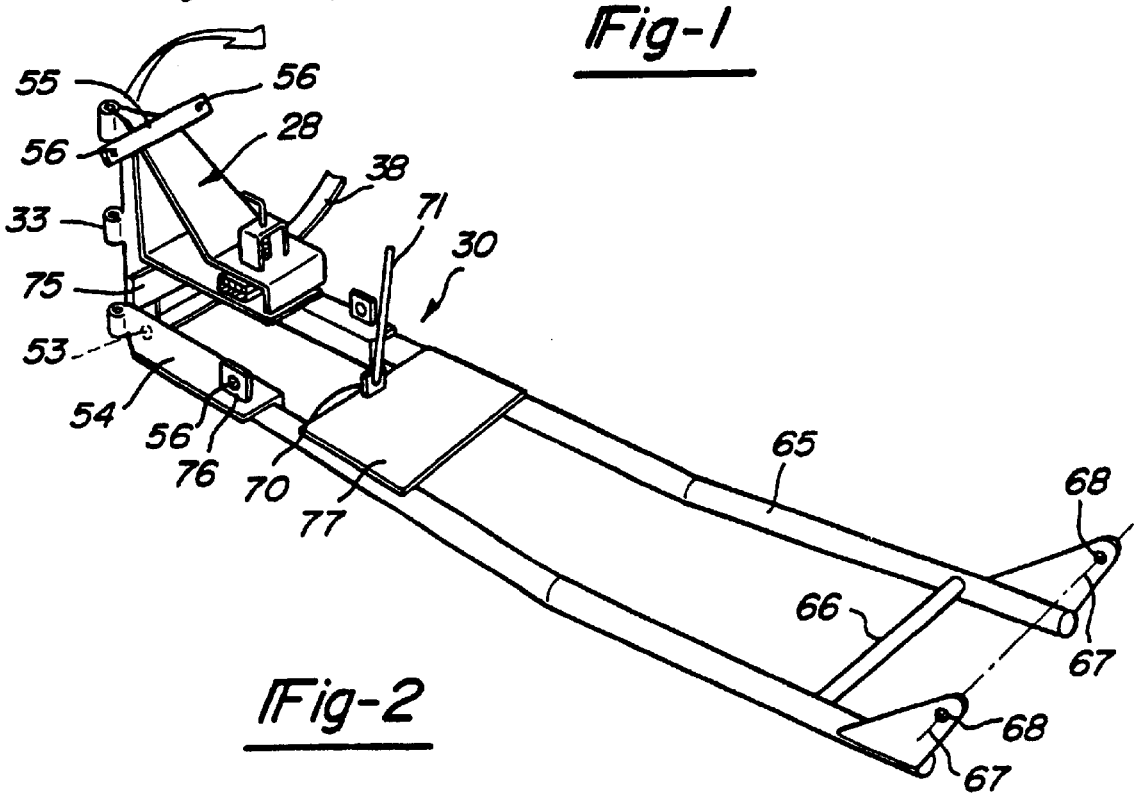
FIG. 2 is a perspective view of a portion of the snow plow of the present invention showing a tubular mounting frame, an adapter mounted to the end of the tubular mounting frame, and a cowling adapted to rotate 360 degrees in a vertical plane about the adapter.

Referring now to FIG. 2, the universal nature of the improved snow plow of the present invention can be observed. It can be seen that the adapter 30 is mounted to the tubular frame 65 by any suitable means. The frame 65 may have suitable reinforcements 66, and mounting means 67, which may have mounting holes 68 provided therein. The mounting means 67 may take a wide variety of forms as needed to provide for the mounting of the tubular frame to the midpoint of the particular off-road vehicle or the front of lawn tractor being used. The mounting means should be understood broadly to include whatever attachments are needed to the tubular frame 65 to mount the improved snow plow to an off-road vehicle.

As can be seen in FIGS. 1 and 2, a bracket 70 may also be mounted to the adapter 30, and connected by a control rod 71, to a bell crank 73 mounted to off road vehicle 20. Bell crank 73 is connected, in turn, to operating lever 74 by second control rod 79. Operating lever 74 can be operated, such that the off-road vehicle operator may raise and lower the snow plow as desired.

If a simplified construction of the snow plow blade positioning means is desired, instead of the spring loaded pin 42, a non-spring loaded pin (not shown) may be provided.

Thus, by carefully studying the available prior art snow plows, and the capability of off-road vehicles, I have provided a novel off-road vehicle snow plow.

What is claimed is:

1. A snow plow attachment for an off-road vehicle, said attachment including, in combination:

(a) a pair of plow blades hingedly mounted to a, (b) cowling, said cowling pivotally mounted for substantially 360° rotation in a vertical plane when unattached to said blades, said cowling mounted to a, (c) pivot means, said pivot means connected to an (d) adapter, said adapter connected to a, (e) frame member, said frame member, including mounting means.

2. The snow plow defined in claim 1, and further including a mechanical adjustment means connected between said plow blades and said cowling for retaining said plow blades in a preset predetermined position.

3. The snow plow defined in claim 2, wherein said adjustment means include:

(a) a pair of radius rods each of which is mounted at one end to one of said plow blades and is restrained at the other end by a spring loaded pin, movably mounted to said cowling.

4. The snow plow as defined in claim 3, wherein said frame member is a tubular frame member.

5. The snow plow as defined in claim 3, wherein a pair restraining springs are mounted between said cowling and said adapter.

6. An off-road vehicle snow plow including:

(a) a frame member mounted to an off-road vehicle, (b) an adapter fixedly connected to said frame member, (c) pivot means provided on said adapter, (d) a cowling pivotally mounted to said pivot means for rotation through substantially 360° in a vertical plane when unattached to snow plow blades, said cowling including a portion of a hinge means for the attachment of snow plow blades.

7. The snow plow defined in claim 6, and further including:

(a) a pair of plow blades, each including a portion of hinge means, which when aligned with said hinge means on said cowling provides for attaching of said plow blades to said cowling by means of a hinge pin.

8. The snow plow defined in claim 7, wherein said pivot means includes an elongated bushing mounted to said cowling, and a pair of axially aligned holes provided in arms forming a part of said adapter, said cowling being mounted to said adapter by passing a pivot pin through said holes and said elongated bushing.

9. The snow plow defined in claim 7, and further including mechanical restraining means for holding said plow blades in preset predetermined positions.

10. The snow plow defined in claim 9, wherein said mechanical restraining means further includes:

(a) at least one bracket mounted to each of said plow blades, (b) a pair of curvilinear radius rods rotatably mounted to each of said brackets at one of their ends and having a plurality of holes proximate their other ends.

11. The snow plow defined in the claim 10 and further including pin means cooperating with said curvilinear radius rods to hold said plow blades in a predetermined preset position.

12. The snow plow defined in claim 11, and including restraining spring means and vertical stop means to hold said plow blades in a generally vertical position and to permit tilting of the cowling and the blades when necessary.

13. The snow plow defined in claim 12, wherein each of said pair of radius rods having a right angle portion formed on the end thereof proximate said other ends to prevent their inadvertent removal from said adjustment means.

14. A snow plow attachment for an off road vehicle, said attachment including, in combination:

(a) a pair of plow blades hingedly mounted to a, (b) cowling pivotably mounted to an, (c) adaptor connected to a, (d) tubular frame member, said frame member including mounting means, (e) manual adjustment means connected between said snow blades and said cowling for retaining said snow plow blades in a preset predetermined position, wherein said adjustment means include:

(i) a pair of radius rods, each of which is mounted at one end to one of said snow plow blades, and is restrained at the other end by a spring loaded pin, movably mounted to said cowling, (f) a pair of restraining springs mounted between said cowling and said adapter, (g) a bracket mounted to said adapter, (h) a control rod connected at one end to said bracket, [and]

(i) an operating lever mounted to an off road vehicle [and], (*j*) *a bellcrank mounted to said off road vehicle, said operating lever* connected to [the] *an* other end of said control rod through said bell crank.

15. The snow plow defined in claim 14, wherein said adapter includes:

(a) a stiffening plate connected between two arms of a tubular frame, and (b) a pair of arms mounted to said tubular frame ahead of said stiffening plate.

16. The snow plow defined in claim 15, wherein each of said radius rods has a right angle portion to prevent its inadvertent removal from said adjustment means.

* * * * *